United States Patent
Liu et al.

(10) Patent No.: US 9,514,478 B2
(45) Date of Patent: Dec. 6, 2016

(54) CONVERSION TRACKING FOR INSTALLATION OF APPLICATIONS ON MOBILE DEVICES

(71) Applicant: Facebook, Inc., Menlo Park, CA (US)

(72) Inventors: Deborah Liu, Menlo Park, CA (US); Nipun Mathur, Menlo Park, CA (US); Teck Chia, Menlo Park, CA (US); Vijaye Raji, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 92 days.

(21) Appl. No.: 13/748,560

(22) Filed: Jan. 23, 2013

(65) Prior Publication Data

US 2014/0207900 A1    Jul. 24, 2014

(51) Int. Cl.
*G06Q 30/02* (2012.01)
*G06F 15/173* (2006.01)
*G06Q 50/00* (2012.01)

(52) U.S. Cl.
CPC ..... *G06Q 30/0246* (2013.01); *G06F 15/17331* (2013.01); *G06Q 30/0242* (2013.01); *G06Q 30/0269* (2013.01); *G06Q 50/01* (2013.01)

(58) Field of Classification Search
CPC ............... G06F 15/17331; G06Q 30/2046; G06Q 30/0242; G06Q 30/0269; G06Q 50/01
USPC ........................................................ 709/216
See application file for complete search history.

(56) References Cited

U.S. PATENT DOCUMENTS

| | | | | |
|---|---|---|---|---|
| 7,853,881 B1* | 12/2010 | Aly Assal | ............. | G06Q 10/10 715/734 |
| 2003/0028344 A1* | 2/2003 | Pierce | ................ | G05B 23/0264 702/127 |
| 2008/0162338 A1* | 7/2008 | Samuels | ................. | G06F 21/40 705/38 |
| 2009/0222348 A1 | 9/2009 | Ransom et al. | | |
| 2009/0254753 A1 | 10/2009 | De Atley et al. | | |
| 2009/0280792 A1 | 11/2009 | Leblanc et al. | | |
| 2009/0319359 A1 | 12/2009 | Soza et al. | | |
| 2010/0281528 A1 | 11/2010 | Hayton et al. | | |
| 2012/0005586 A1 | 1/2012 | Uola et al. | | |
| 2012/0028623 A1* | 2/2012 | Verdon | .................. | G06Q 30/02 455/418 |

(Continued)

FOREIGN PATENT DOCUMENTS

WO    WO 2009/100460 A1    8/2009

OTHER PUBLICATIONS

European Extended Search Report, European Application No. 14151554.4, Mar. 6, 2014, 8 pages.

(Continued)

*Primary Examiner* — Moustafa M Meky
*Assistant Examiner* — SM Z Islam
(74) *Attorney, Agent, or Firm* — Fenwick & West LLP (57) ABSTRACT

An application executing on a mobile device, such as an application associated with a social networking system provides a link to install a third-party application. The link may be presented in an advertisement, and the link is used to retrieve data comprising a client application for execution by the mobile device. To track installations, the client application stores an indication that the client application was installed in a shared memory location on the mobile device, as native applications do not have access to cookies. A social networking application executing on the mobile device retrieves the indication the client application was installed from the shared memory location and communicates it to a social networking system for storing in a user profile.

18 Claims, 4 Drawing Sheets

(56) References Cited

U.S. PATENT DOCUMENTS

| | | | |
|---|---|---|---|
| 2012/0129503 A1 | 5/2012 | Lindeman et al. | |
| 2012/0166532 A1 | 6/2012 | Juan et al. | |
| 2012/0253920 A1 | 10/2012 | Yarvis et al. | |
| 2013/0024759 A1 | 1/2013 | Yuan | |
| 2013/0138569 A1 | 5/2013 | Yan et al. | |
| 2013/0254849 A1 | 9/2013 | Alison et al. | |
| 2013/0290084 A1 | 10/2013 | Ur | |
| 2014/0012924 A1* | 1/2014 | Jagernauth | G06Q 50/10 709/206 |
| 2014/0074571 A1 | 3/2014 | Hope et al. | |
| 2014/0136651 A1* | 5/2014 | Hodges | G06F 8/665 709/217 |

OTHER PUBLICATIONS

PCT International Search Report and Written Opinion, PCT Application No. PCT/US2014/012447, Apr. 29, 2014, 11 pages.

European Patent Office, Examination Report, European Patent Application No. 14151554.4, Jan. 11, 2016, eight pages.

United States Office Action, U.S. Appl. No. 14/334,651, Jul. 5, 2016, fifteen pages.

United States Office Action, U.S. Appl. No. 14/334,651, Jun. 8, 2015, thirteen pages.

Canadian Intellectual Property Office, Office Action, Canadian Patent Application No. 2,893,443, Aug. 12, 2016, three pages.

* cited by examiner

CONVERSION TRACKING FOR INSTALLATION OF APPLICATIONS ON MOBILE DEVICES

BACKGROUND

The present disclosure relates to conversion tracking, and in particular to tracking installations of native applications on mobile devices.

Advertisement revenue provides an important revenue stream for social networking systems and other online system. Some advertisements may identify client applications allowing users to interact with content provided by a third-party system. Often, an advertisement includes a link to download the client application for installation. However, users increasingly interact with content using mobile devices, which frequently use an application store or other program to manage retrieval and installation of applications on the mobile device.

Hence, a user may access a link to download a client application from an advertisement using a mobile device, causing the client application to be installed via the application store. However, this installation through the application store does not provide information to the third-party system or advertiser promoting the application that the user interacted with the advertisement and subsequently installed the application. For example, a user may interact with an advertisement for a client application on a mobile device, which subsequently accesses the application store of the mobile device, and elect not to install the application. Because the installation occurs through the application store, the third-party system or advertiser promoting the client application does not receive information whether the client application was installed on the mobile device.

SUMMARY

Embodiments of the present disclosure allow a social networking system to identify installations of a client application on a mobile device. The client application is a native application executed by an operating system of the mobile device, so the client application is unable to access cookies. Hence, data comprising the client application includes one or more instructions from the social networking system that store an indication in a shared memory location of the mobile device that the client application was installed on the device. A social networking application executing on the mobile device and associated with the social networking system retrieves the indication from the shared memory location that the client application was installed on the device. User identifying information used by the social networking application and the indication the client application was installed are transmitted to the social networking system by the social networking application. Based on the user identifying information, the social networking system identifies a user account and stores the indication the client application was installed on the mobile device. If this installation occurred after the user was presented with an advertisement for the application (e.g., where the advertisement contains a link to a location, such as an app store, for installing the application), the system may count the installation as a conversion event for the advertisement. Advertising metrics including conversions may then be reported to the advertisers.

In one embodiment, the social networking system communicates the indication the client application was installed on the mobile device to a third-party system associated with the client application. This allows the third-party system to track a number of installations of the client application on mobile devices. In one embodiment, the social networking system may anonymize the user identifying information and send the anonymized user identifying information to the third-party system. Alternatively, information describing the mobile device stored in the indication the client application was installed may be sent the third-party system. For example, a type associated with the mobile device or a mobile device identifier may be communicated to the third-party system along with the indication the client application was installed on the mobile device.

The figures depict various embodiments of the present disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

Overview

Figure 1A:
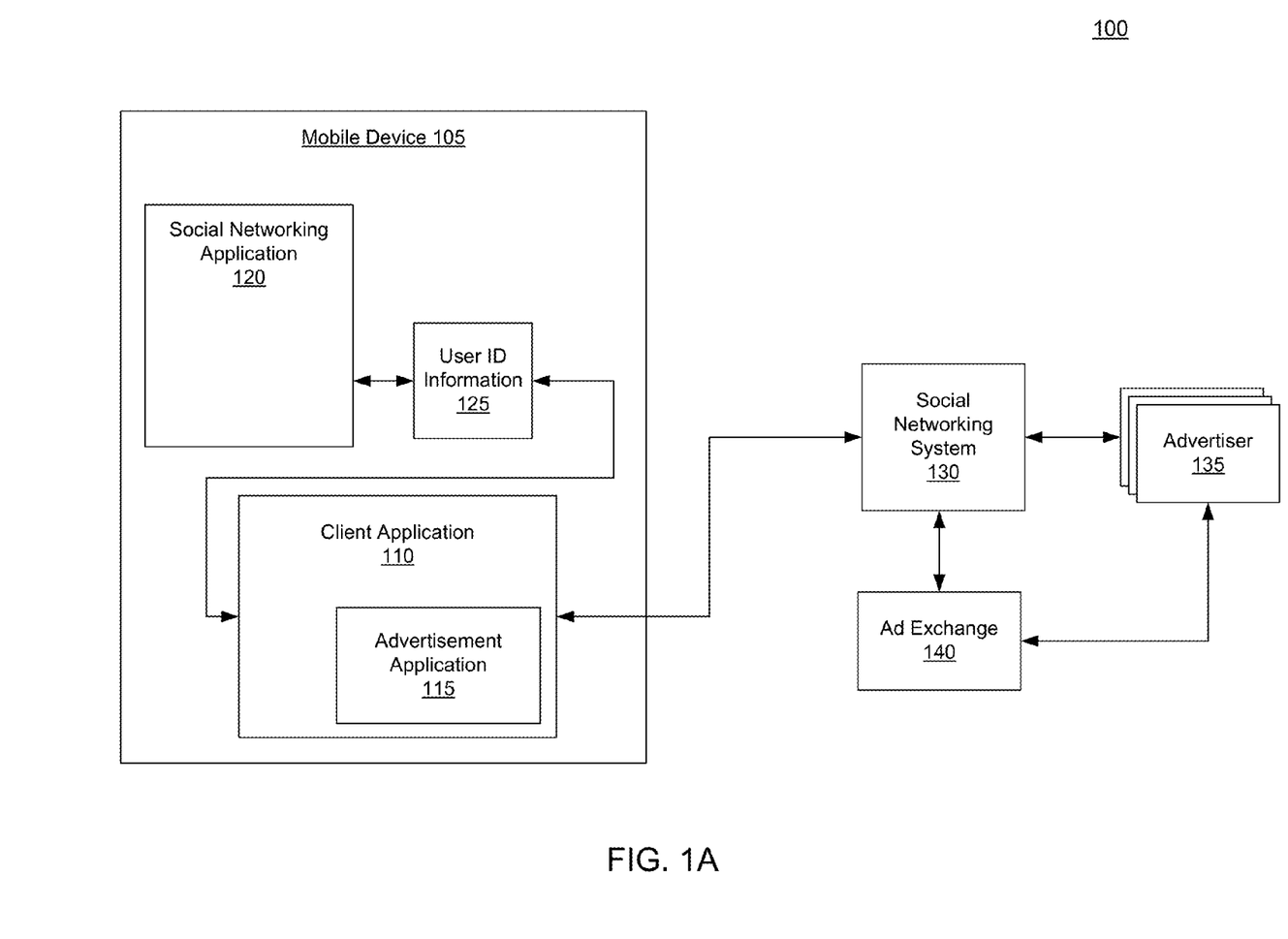
FIG. 1A illustrates a block diagram of a system environment for retrieving advertisements targeted to a mobile device user using the user's association with a social network, in accordance with an embodiment.

FIG. 1A is a block diagram of system environment 100 for using a mobile device user's association with a social networking system to retrieve advertisements targeted to the user. The system environment 100 shown by FIG. 1A includes a mobile device 105 including a client application 110. The client application 110 may be any application presenting content to a user of the mobile device 105. Content presented by the client application 110 may include one or more advertisements. For example, the client application 110 is a news application displaying news and advertisements to a mobile device user.

To provide advertisements, the client application 110 includes an advertisement application 115 that retrieves advertisements to be presented to the user. Advertisements that are associated with a user profile or with a group of user profiles are known as targeted advertisements. The advertisement application 115 retrieves user identification ("ID") information 125 for the user stored on the mobile device 105. In one embodiment, user ID information 125 is associated with a social networking application 120 included on the mobile device 105. For example, user ID information 125 includes a user identifier uniquely associating the user with a user profile within a social networking system 130. The user ID information 125 may be stored in a shared memory location of the mobile device 105 to more readily allow the social networking application 120 and the advertisement application 115 to access the user ID information 125. Although the user ID information 125 is depicted in FIG. 1A as being derived from user information maintained by the mobile device 105, in another embodiment the user ID information 125 is derived independently from any user information on the mobile device 105. For example, the user ID information 125 may be an identifier provided by the social networking system 130 or a system external to the social networking system 130. The social networking system 130 may maintain a mapping of user ID information 125 with each user of the social networking system 130 and each social networking application 120.

In one embodiment, the social networking application 120 hashes the user ID information 125 and stores the hashed user ID information in the shared memory location of the mobile device 105. The social networking application 120 may generate the hash from any item of information associated with a user. Examples of items of information associated with a user include an account identifier, an email, a login name, an identifier used by the social networking system 130, or any other suitable information. The hashed user ID information is retrieved by the advertisement application 115 or by the client application 110 and communicated to the social networking system 130. Using user ID information stored by the social networking system 130, the social networking system 130 generates hash identifiers and compares the received hashed user ID information to the hash identifiers. If a hash identifier matches the hashed user ID information, the social networking system 130 retrieves a user profile associated with the hash identifier. The received user profile may be used to obtain information about a user for selecting an advertisement or to store information identifying an advertisement with which a user interacted with using the mobile device 105. Hashing of user ID information is further described in U.S. patent application Ser. No. 13/306,901, filed on Nov. 29, 2011, which is hereby incorporated by reference in its entirety.

The advertisement application 115 sends a request for an advertisement to a social networking system 130 that includes the user ID information 125. In some embodiments the request for an advertisement may additionally include one or more request parameters. Request parameters are conditions which the social networking system 130 may use to limit advertisements provided to the client application 110. For example, a request parameter causes the social networking system 130 to select advertisements that have not been previously displayed to the user.

The social networking system 130, further described below in conjunction with FIG. 3, selects one or more advertisements using the user ID information 125 and any additional request parameters from the requests for advertisements. One or more of the selected advertisements are provided to the client application 110 by the social networking system 130. In some embodiments, the social networking system 130 embeds social context information within a selected advertisement if the user identified by a request for an advertisement is presently logged into social networking system 130, via, a social networking application 120, a browser located on mobile device 105, or any other suitable mechanism.

The social networking system 130 selects the advertisement from one or more candidate advertisements, which are each associated with at least one advertisement ("ad") object. An ad object includes an advertisement and an associated bid price. An advertisement generally includes any communication intended to cause the recipient of the communication to take some action concerning a product or service. For example, an advertisement includes an offer for a deal.

One or more advertisers 135 provide ad objects to social networking system 130. In some embodiments, an advertiser 135 provides the ad object directly to the social networking system 130. Alternatively, an advertiser 135 may provide the ad object to social networking system 130 indirectly by using an ad network or an ad exchange 140.

Ad objects may also include targeting criteria that specifies characteristics of social networking system users to receive a particular advertisement. An advertiser 135 may provide an ad object without targeting criteria. If no targeting criteria are provided, the social networking system 130 may analyze the content of the ad object to infer targeting criteria based on a fuzzy matching algorithm that may use the types of interactions performed by users, user characteristics, and/or types of connections between users in the group as characteristics.

Social networking system 130, as further described below, maintains user profiles, edge objects, and content objects to provide information about its users. These user profile objects, edge objects, and content objects may be analyzed to identify users matching one or more targeting criteria of an advertisement. For example, groups of users having a common characteristic satisfying one or more targeting criteria are identified by social networking system 130. One or more targeted advertisements are associated with users matching one or more targeting criteria. For example, the social networking system 130 associates one or more archery-related advertisements with users matching one or more targeting criteria of the archery-related advertisements. For example, the social networking system generates a group of users matching one or more targeting criteria using user identifiers associated with the users in the group; thus, based on a user identifier, the targeting criteria matched by a group of users may be associated with user identifiers of users matching the targeting criteria, allowing more efficient identification of targeting criteria matched by an identified user. Alternatively, targeting criteria matched by a user are associated with the user, allowing retrieval of the user's matching targeting criteria based on a received user identifier.

The social networking system 130 extracts the user identifier from the received user ID information 125 and determines one or more targeting criteria satisfied by the corresponding user. Based on the targeting criteria, the social networking system 130 identifies one or more candidate advertisements for the identified user. Any request parameters associated with the targeted request for an advertisement are extracted and applied by the social networking system 130 to filter the pool of candidate advertisements. For example, if a request parameter dictates that the targeted advertisement has not been previously provided to client application 110, social networking system 130 removes previously presented advertisements from the candidate advertisements.

From the candidate advertisements, the social networking system 130 selects an advertisement associated with one or more targeting criteria satisfied by the user identified from the received user ID information 125. For example, an advertisement associated with a user identifier included in a group of user identifiers matching targeting criteria is selected. As another example, the social networking system 130 performs an auction based on the expected value of each of the candidate advertisements and selects the advertisement based on the auction. An internal auction, an external auction, or both may be used by the social networking system 130 to select a targeted advertisement to provide to client application 110. In some embodiments, the user social networking system 130 limits the candidate advertisements included in the objects. For example, other information about the user or users connected to the user is used to select a subset of the candidate advertisements included in the auction. Alternatively, the candidate advertisements included in the auction are not limited.

In some embodiments, the social networking system 130, or another advertising provider, may select of the advertisement based on information about the user stored by the social networking system 130. For example, information about the user maintained by the social networking system 130 indicates that the user has previously viewed content from, or is associated with (e.g., a connection exists in the social networking system between the user and the advertiser), the candidate target advertisements' advertisers. This information may increase the likelihood that the advertisement selected is from an advertiser with which the user has previously interacted, allowing advertisements to be retargeted based on content viewed by the user via the mobile device 105.

In some embodiments, the social networking system 130 may also embed social context information into a selected advertisement. To embed social context information, the social networking system 130 determines whether the user is logged into the social networking system 130 via a social networking application 120 on mobile device 105, a browser operating on mobile device 105, etc. If the user is logged onto the social networking system 130, the social networking system 130 may embed social context information associated with the user into the selected advertisement. Social context information identifies actions with the advertisement or with objects associated with the advertisement by other users of the social networking system 130 connected to the user of the mobile device 105. For example, if user X is connected to users Y and Z, and user Y is has expressed a preference for a page in the social networking system 130 associated with a product in a selected advertisement, the selected advertisement is modified to include social context information that "user Y likes this product" when delivered to user X.

The social networking system 130 then provides the selected advertisement to the client application 110, which presents the selected advertisement to the user along with any embedded social context. For example, the client application 110 displays the selected advertisement to the user, plays audio associated with the selected advertisement for the user, or otherwise presents the selected advertisement to the user.

Figure 1B:
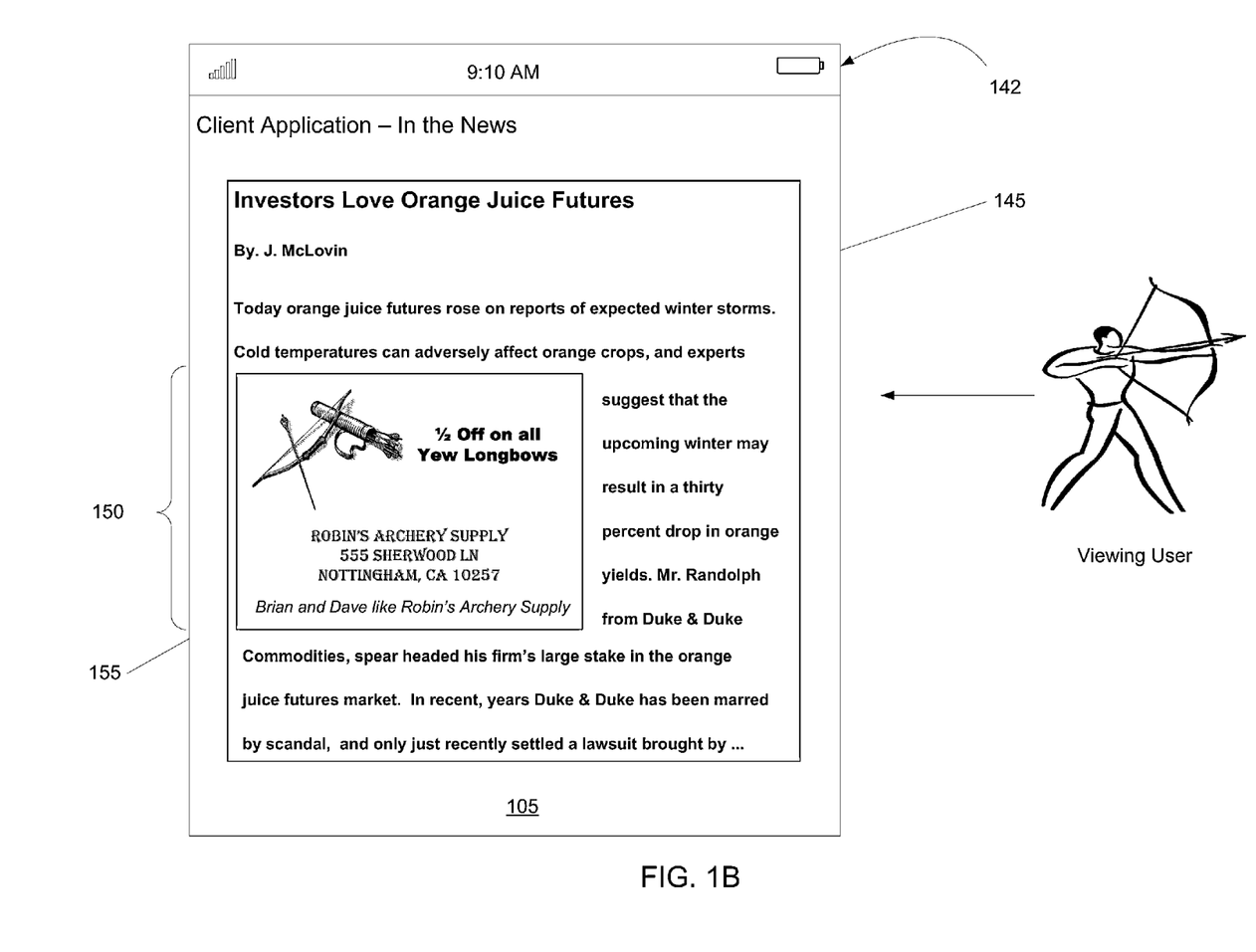
FIG. 1B illustrates an example display of an active client application on a mobile device presenting an advertisement selected for a user, in accordance with an embodiment.

FIG. 1B illustrates an example display 142 of an active client application 110 on mobile device 105 presenting a selected advertisement 150 to the user. As used herein, an "active application" is an application that is currently presenting content to the user. In the example of FIG. 1B, the client application 110 is a news application delivering client content 145 to the user, and the selected advertisement 150 is embedded within content presented by the display 145. However, in other embodiments, the selected advertisement 150 may be presented in a separate display, such as a pop up window, a banner, etc. In FIG. 1B, the social networking system 130 determined that the user satisfies one or more targeting criteria identifying users with an interest in archery; hence, the selected advertisement 150 is related to archery.

Additionally, in the example of FIG. 1B, the social networking system 130 determined that the user was logged into social networking system 130 when the selected advertisement is requested. Hence, the selected advertisement 150 in FIG. 1B includes social context information 155.

System Architecture

Figure 2:
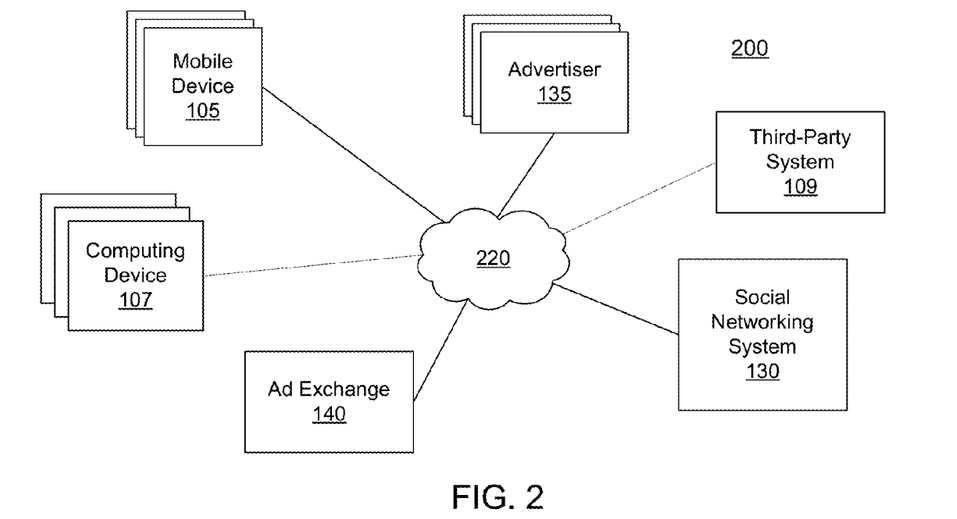
FIG. 2 illustrates a block diagram of a system environment for serving an advertisement to users of a social network, in accordance with an embodiment.

FIG. 2 illustrates a block diagram of a system environment 200 for serving an advertisement to users of the social network. The system environment 200 includes one or more mobile devices 105 and computing devices 107 coupled to the social networking system 130, to a third-party system 109, to one or more advertisers 135, and to an advertisement ("ad") exchange 140 via a network 220. In various embodiments, the system environment 200 may be organized in an alternative topology or configuration, and include different and/or additional modules.

The advertisers 135 provide ad objects to entities in system environment 200, and one or more of the ad objects are selected for presentation to a user of mobile device 105. The ad exchange 140 facilitates bidding, buying, selling, or some combination thereof, of ad objects from advertisers 135 to systems facilitating delivery of advertisements associated with the ad objects to their intended audience (e.g., all users, targeted to particular groups, etc.).

The mobile devices 105 comprise one or more computing devices capable of receiving user input as well as transmitting and/or receiving data via the network 220. Examples of a mobile device 105 include a personal digital assistant (PDA), a mobile telephone, a smart-phone or other devices operating without using cookies describing user actions. Mobile devices 105 may be equipped for cellular communication, Wi-Fi communications, or both.

The computing devices 107 are also capable of receiving user input as well as transmitting and/or receiving data via the network 220, but are capable of storing cookies describing user actions. Examples of computing devices include a desktop computer, a laptop computer, a netbook computer, or other similar device.

As discussed above, each mobile device 105 includes the social networking application 120 and the client application 110. The social networking application 120 allows a social networking system user to exchange data with the social networking system 130 via a mobile device 105 and the network 220. User identification (ID) information for each user of a mobile device 105 previously accessing the social networking system 130 via the social networking application 120 is stored on the mobile device 105.

The client application 110 may be any application capable of presenting content to the mobile device user and is configured to present advertisements in conjunction with client content. For example, client application 110 may be a news application that displays advertisements to the user along with news content. Additionally, client applications 110 may differ across different mobile devices 105. For example, the client application 110 may be a news application on a mobile device 105 and may be a weather application on a separate mobile device 105.

As discussed above in conjunction with FIG. 1A, a client application 110 includes an advertisement application 115 that sends requests for advertisements to the social networking system 130. The advertisement application 115 retrieves the user ID information 125 associated with the social networking application 120 that is stored in a shared memory location of the mobile device 105. Alternatively, the advertisement application 115 causes the client application 110 to retrieve the user ID information 125 from the shared memory location. By storing the user ID information 125 in a shared memory location, the social networking application 120 allows other applications, such as the client application 110, to identify a social networking system user operating the mobile device 105. This allows the other applications to provide advertisements that are based on information maintained by the social networking system 130 about the user corresponding to the user ID information 125. In embodiments where the user ID information 125 is associated with multiple users, the advertisement application 115 may select components of the user ID information 125 that are associated with one or more users. Using the user ID information 125, the advertisement application 115 sends a request for an advertisement including the user ID information 125 to the social networking system 130. The advertisement application 115 receives an advertisement selected by the social networking system 130, and the advertisement application 115 communicates with the client application 110 to display the received advertisement. In some embodiments, the advertisement application 115 may be created using a software development kit (SDK). The social networking system 130 may make available the SDK software to software developers. And in some instances, the social networking system 130 may charge a fee for use of the SDK software.

The mobile devices 105 are configured to communicate via network 220. A mobile device 105 may execute an application (e.g., client application 110, social networking application 120, etc.) that interacts with the social networking system 130 through an application programming interface (API) running on the native operating system of the mobile device 105, such as IOS® and ANDROID™. Additionally, the advertisement application 115 may allow interactions between the client application 110 and the social networking system 130 and/or the social networking application 120. In some embodiments, the mobile device 105 executes an application allowing a user of the mobile device 105 to receive an advertisement from the social networking system 130 or to otherwise interact with the social networking system 130.

In one embodiment, network 220 uses standard communications technologies and/or protocols. Thus, network 220 may include wired and/or wireless links using technologies such as Ethernet, 802.11 family of standards, worldwide interoperability for microwave access (WiMAX), 3G, 4G, CDMA, digital subscriber line (DSL), etc. Examples of networking protocols used on the network 220 include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 220 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

A third-party system 109 is one or more computing systems providing content to one or more mobile devices 105 via the network 220. The third-party system 109 may be associated with one or more client applications 110, and a mobile device 105 receives data comprising the client application 110 via the network 220. The mobile device 105 executes the received data to install the client application 110 on the mobile device 105, allowing the third-party system 109 to provide content to the mobile device 105 via the client application 110.

Figure 3:
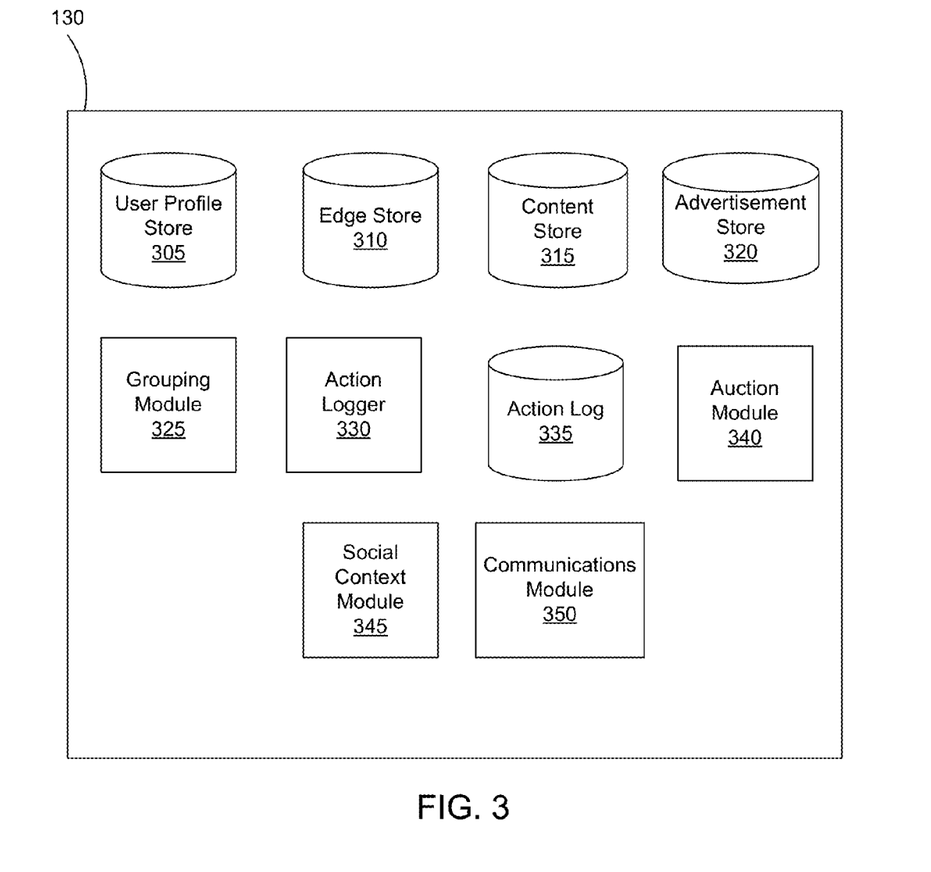
FIG. 3 is an example block diagram of a system architecture of a social networking system, in accordance with an embodiment.

FIG. 3 is an example block diagram of a system architecture of the social networking system 130. The social networking system 130 includes a user profile store 305, an edge store 310, a content store 315, an advertisement store 320, a grouping module 325, an action logger 330, an action log 335, an auction module 340, a social context module 345, and a communications module 350. In other embodiments, the social networking system 130 may include additional, fewer, or different modules for various applications. Conventional components such as network interfaces, security functions, load balancers, failover servers, management and network operations consoles, and the like are not shown so as to not obscure the details of the system architecture.

User account information and other related information for users are stored as user profile objects in user profile store 305. For example, each user of the social networking system 130 has an associated user identifier that is unique to the user and is part of their user account information. The user identifier is stored in a user profile maintained by the user profile store 305. The user profile information stored in user profile store 305 also describes the users of the social networking system 130, including biographic, demographic, and other types of descriptive information, such as work experience, educational history, gender, hobbies or preferences, location, and the like. User profile information may also store other information provided by the user, for example, images or videos. In certain embodiments, images of users may be tagged with identification information of users of the social networking system 130 displayed in an image. The user profile store 305 also maintains references to the actions stored in an action log 335 and performed on objects in the content store 315. The user profile store 305 also includes data in a user profile indicating whether a user corresponding to the user profile is currently logged into social networking system 130. Additionally, a user profile may include information received from the mobile device 105 identifying content accessed or viewed by the user via the mobile device 105. This allows the user profile to include information describing content viewed by the user, which may be used to subsequently select advertisements or other content for presentation to the user. In one embodiment, the content is associated with an advertiser identifier or other information allowing an advertiser to be determined from the content.

The edge store 310 stores the information describing connections between users and other objects on the social networking system 130 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 130, such as expressing interest in a page on the social networking system 130, sharing a link with other users of the social networking system 130, and commenting on posts made by other users of the social networking system 130.

The edge store 310 also includes information about the edge, such as affinity scores for objects, interests, and other users. Affinity scores may be computed by the social networking system 130 over time to approximate a user's affinity for an object, interest, and other users in the social networking system 130 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge in the edge store 310, in one embodiment. For example, a user that plays multiple songs from Miles Davis' album, "Kind of Blue," may have multiple edges between the user and different songs, but a single edge between the user and an object for Miles Davis.

The content store 315 stores content items associated with a user profile, such as images, videos, and audio files. Content items from the content store 315 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system, or to increase interaction with the social networking system 130 by displaying content related to users, objects, activities, or functionalities of the social networking system. Examples of social networking content items include suggested connections or suggestions to perform other actions, media provided to, or maintained by, the social networking system 130 (e.g., pictures or videos), status messages or links posted by users to the social networking system 130, events, groups, pages (e.g., representing an organization or commercial entity), and any other content provided by or accessible via the social networking system 130.

In one embodiment, advertisement objects ("ad objects") are stored in the advertisement store 320; however, in other embodiments, ad objects may be stored in the content store 315. Ad objects may be received from one or more of advertisers 135 and the ad exchange 140. An ad object includes an advertisement and an associated bid amount and may also include targeting criteria specifying one or more characteristics of a user eligible to be presented the advertisement. The bid amount specifies an amount of compensation an advertiser 135 will provide the social networking system 130 for presenting the advertisement to a user, for receiving a user interaction with the advertisement, or based on any other suitable criteria. The bid amount may be used to determine an expected value to the social networking system 130 for presenting an advertisement to a user. For example, the bid amount specifies a monetary amount that the social networking system 130 receives from the advertiser if the advertisement is displayed and the expected value is determined by multiplying the bid amount by a probability of the advertisement being accessed.

In one embodiment, the social networking system 130 includes a grouping module 325 that retrieves targeting criteria from received ad objects. The grouping module 325 accesses information about users from the user profile store 305, the edge store 315 and/or the action log 335 to identify users satisfying one or more targeting criteria. In one embodiment, the grouping module 325 associates groups of users with targeting criteria satisfied by users in a group. A group of user profiles includes users that have some common characteristic satisfying targeting criteria associated with the group. For example, a group of users includes user identifiers associated with one or more users.

The grouping module 325 may associate one or more advertisements with a group of users to expedite selection of users satisfying targeting criteria associated with the advertisement. For example, the social networking system 130 retrieves targeting criteria from an advertiser to target one or more advertisements to users that have previously checked-in to a specified location. More generally, targeting criteria associated with advertisements may be used to identify any edge, action, characteristic or other information for identifying users to received the advertisement. From the targeting criteria and accessed information, the grouping module 325 identifies groups of users having the characteristics specified by the targeting criteria (e.g., having performed the check-in action to the specified location). User identifiers associated with users satisfying the targeting criteria are included in the group of users, which may be associated with the targeting criteria or with the advertisement. In some embodiments, targeting criteria associated with an advertisement may not necessarily include objects. For example, to advertise for a local marathon, an advertisement may include targeting criteria to identify users that have previously run a marathon.

The action logger 330 receives communications about user actions on and/or off the social networking system 130, and populates the action log 335 with information about user actions. Such actions may include, for example, adding a connection to another user, sending a message to another user, uploading an image, reading a message from another user, viewing content associated with another user, attending an event posted by another user, among others. In addition, a number of actions described in connection with other objects are directed at particular users, so these actions are associated with those users as well. These actions are stored in the action log 335.

Users may interact with various objects on the social networking system 130, including commenting on posts, sharing links, and checking-in to physical locations via mobile device 105, accessing content items in a sequence, or other interactions. Information describing these actions is stored in the action log 335. Additional examples of interactions with objects on the social networking system 130 included in the action log 335 include commenting on a photo album, enabling communications between users, becoming a fan of a musician, adding an event to a calendar, joining a group, becoming a fan of a brand page, creating an event, authorizing an application, using an application, and engaging in a transaction. Additionally, the action log 335 records a user's interactions with advertisements on the social networking system 130 as well as other applications operating on the social networking system 130.

The action log 335 may also store user actions taken on external websites. For example, an e-commerce website that primarily sells sporting equipment at bargain prices may recognize a user of a social networking system 130 through social plug-ins that enable the e-commerce website to identify the user of the social networking system 130. Because users of the social networking system 130 are uniquely identifiable, e-commerce websites, such as this sporting equipment retailer, may use the information about these users as they visit their websites. The action log 335 records data about these users, including webpage viewing histories, advertisements that were engaged, purchases made, and other patterns from shopping and buying.

The auction module 340 selects advertisements from the advertisement store 320 for presentation to a user, such as presentation via a client application 110 on the mobile device 105. In one embodiment, the auction module 340 accesses the advertisement store 320 and/or the grouping module 325 to identify candidate advertisements for presentation to a user. Alternatively, the auction module 340 receives requests for advertisements including a user identifier and identifies candidate advertisements from the advertisement store 320 associated with targeting criteria that the identified user satisfies. Based on bid prices associated with the candidate advertisements, the auction module 340 ranks the candidate advertisements and uses the ranking to select an advertisement for presentation by the mobile device 105.

In various embodiments, the auction module 340 performs an internal auction, an external auction, or both, to select an advertisement to provide to the client application 110. For example, the auction module 340 determines expected values for the candidate advertisements based on their associated bid amounts and the likelihood of the identified user accessing various candidate advertisements.

In some embodiments, the auction module 340 may base its advertisement selections at least in part on other information about the user stored on the social networking system 130. For example, stored information about the user in the user profile store 305 indicates advertisers from which the user has previously viewed content. For example, a user profile 305 identifies identifiers that a user has previously viewed, so accessing the user profile 305 indicates content that the user has previously accessed. Additional information associated with a user by the social networking system 130 may also be used in advertisement selection. For example, connections between the user and the advertiser may be retrieved from the edge store 310 and used as a factor in selecting advertisements. The auction module 340 may retrieve information from the action log 335, the content store 315, the advertisement store 320, some other module, or some combination thereof, to determine what content the user has previously viewed. For example, the retrieved information may indicate that the user had recently viewed content from Jack's Bow Hunting Supply. The auction module 340 would then weight any candidate advertisement from Jack's Bow Hunting Supply such that it has an increased probability of being selected (e.g., increases the expected value of the advertisement). Associating content that a user has accessed with the user's user profile allows a record of the content accessed by a user to be maintained, even when the content is accessed from sources that do not support cookies or other conventional tracking, such as applications on mobile devices 105. Similarly, if the user was associated with Jack's Bow Hunting Supply, candidate advertisements from Jack's Bow Hunting Supply would also have an increased weight.

In some cases, the user ID information 125 in a request for an advertisement is associated with multiple users. The auction module 340 may identify a subset of the users identified by the user ID information 125. In one embodiment, the auction module 340 selects the user identifiers from the request for an advertisement that are associated with a user currently logged into the social networking system 130 via the social networking application 120. For example, user profiles may be selected based on most recent logging into the social networking system 130, most frequently logging into the social networking system 130 or based on any other suitable criteria. Or, the auction module 340 may select user profiles from the received user ID information 125 based on connections between users in the received user ID information 125. For example, the auction module 340 selects users identified by the received user ID information 125 that are connected to a common object or that are included in the same group by the grouping module 325. For example, user ID information 125 specifies user A and user B, where user A is included in a group associated with targeting criteria X and Y, and user B is included in a group associated with targeting criteria Y and Z. In this example, the auction module 340 associates a group including targeting criteria Z with the user ID information 125. In other embodiments, the auction module 340 identifies user profiles associated with each user identifier included in the user ID information 125.

If a request for an advertisement includes one or more request parameters, the auction module 340 applies the request parameters to filter the candidate advertisements before ranking the candidate advertisements. A request parameter may specify, for example, a parameter that a candidate advertisement has not been previously provided to the client application 110, a specified size of the candidate advertisement, a threshold number of times the candidate advertisement has been provided to the client application 110, a threshold expected value associated with the candidate advertisement, content of the candidate advertisement, or some combination thereof.

If the user identified by the user ID information 215 satisfies targeting criteria for multiple advertisements, auction module 130 may select specific targeting criteria and rank the advertisements associated with the selected targeting criteria. Auction module 130 may select which targeting criteria to select based on characteristics of the advertisements associated with the targeting criteria. For example, targeting criteria associated with advertisements having the highest average expected value, having the highest or lowest frequency of display or any other applicable characteristics may be selected. In other embodiments, auction module 130 may conduct auctions including ads without limiting the advertisements included in the auction.

Social context module 345 identifies social context information associated with a user identified by the user ID information 125 for inclusion in a selected advertisement. For example, social context module 345 retrieves data from the user profile store 305 to determine if a user associated with the user ID information 125 is currently logged into the social networking system 130. If the user is logged in, the social context module 345 identifies users connected to the user from the user profile store 305 and/or the edge store 310 and identifies actions or characteristics of the users connected to the user from the user profile store 305 or from the action log 335. FIG. 1B includes an example of embedded social context information, specifically, "Brian and Dave like Robin's Archery Supply" embedded in the targeted advertisement 150.

Communications module 350 is configured to transmit and receive data, via network 220, from social networking system 130 to a mobile device 105 and/or to another component. The communications module 350 receives requests for advertisements from one or more requesting mobile devices 105 and communicates information from the requests for advertisements to components of the social networking system 130. Additionally, communications module 350 sends an advertisement selected by the social networking system 130, as well as embedded social context information, to the requesting mobile device 105 via the network 220.

Selection of Advertisements for Mobile Device Users

Figure 4:
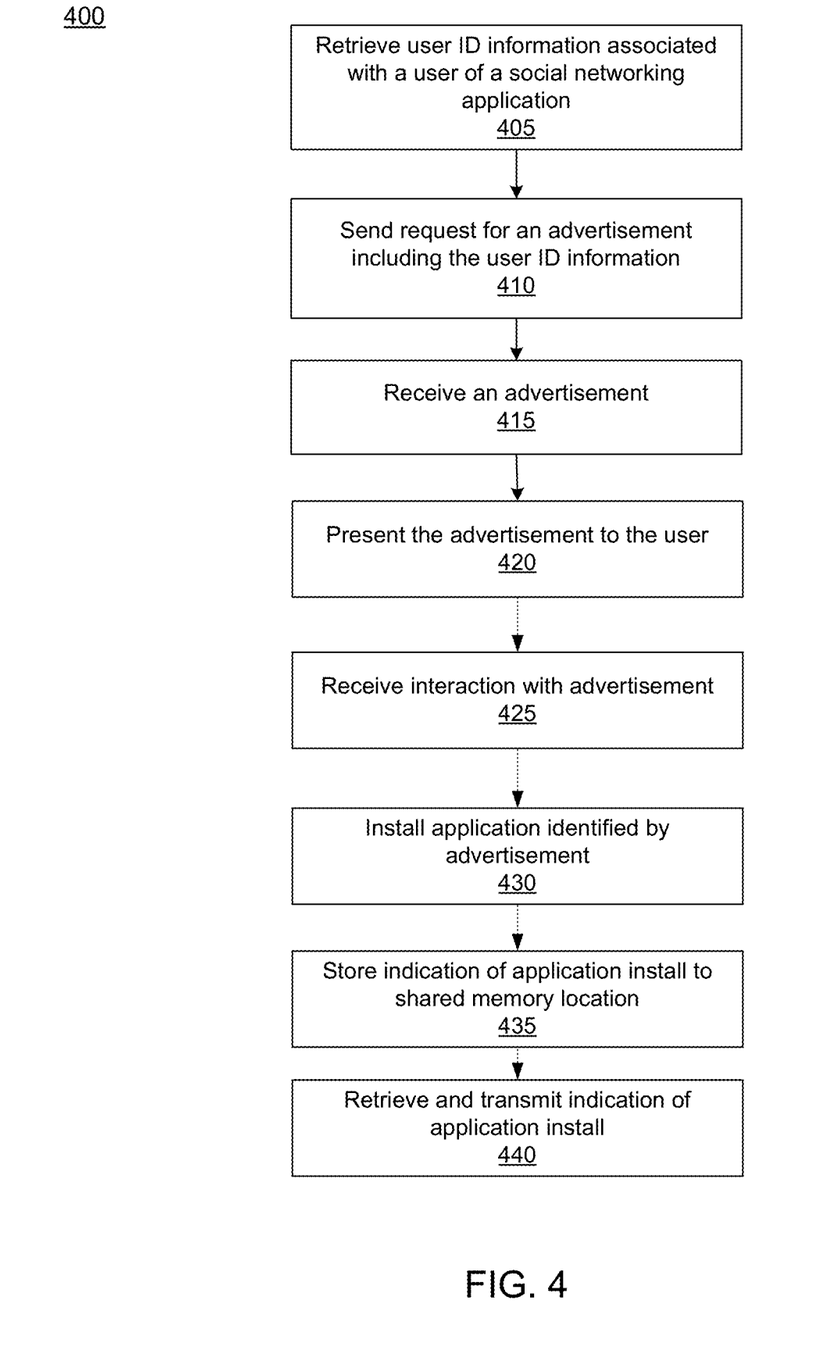
FIG. 4 illustrates a flowchart of a process for retrieving a targeted advertisement from a social networking system using a mobile device, in accordance with an embodiment.

FIG. 4 is a flow chart of one embodiment of a process 400 for retrieving a targeted advertisement from a social networking system 130 using a mobile device 105. A client application 110 operating on the mobile device retrieves 405 user ID information 125 associated with a user of the social networking application 120 operating on the mobile device 105 from a shared memory location in the mobile device 105. Hence, the social networking application 120 stores the user ID information 125 in the shared memory location of the mobile device 105, so that other applications, such as the client application 110, may retrieve the user ID information 125. In some embodiments, the client application 110 includes the advertising application 115 that retrieves 405 the user ID information 125 from the shared memory location.

Based on the retrieved user ID information 125, the client application 110 sends 410 a request for an advertisement including the retrieved user ID information 125 to the social networking system 130.

The social networking system 130 processes the request for an advertisement and selects an advertisement for presentation via the client application 110. For example, the social networking system 130 may base the selection on targeting criteria associated with advertisements stored by the social networking system, and/or information about the user stored by the social networking system 130. In some embodiments, the stored information about the user indicates that the user has previously viewed content from, or is associated with, the candidate target advertisements' advertisers.

The selected advertisement is received 415 by the client application 110, or by the advertising application 115 and is presented 420 to the user via the client application 110. For example, the client application 110 displays the targeted advertisement to the user, plays audio associated with the selected targeted advertisement, etc. In one embodiment, the selected advertisement 415 includes a link to retrieve content comprising a client application 110, allowing the client application to be retrieved and installed by interacting with the application. For example, accessing the link communicates information to an application store executing on the mobile device 105, and the application store retrieves data comprising the client application 110 associated with the link. When the mobile device 105 receives the data comprising the client application 110 from the third-party system 109, or from another source, the mobile device 105 executes the received data to install the client application 110 on the mobile device 105.

When the user of the mobile device 105 interacts 425 with the presented advertisement, user ID information stored in a shared memory location of the mobile device 105 by the social networking application 120 is retrieved by the advertisement application 115. A description of the presented advertisement, the interaction with the presented advertisement and the retrieved user ID information is communicated to the social networking system 130. Information describing the information with the advertisement is stored by the social networking system 130 in a user profile associated with the retrieved user ID information, allowing the user profile to include data describing advertisements with which a user corresponding to the user profile interacted. Additional information about the interactions may also be included in the user profile. For example, a type of interaction, a device type, an identification of a client application identified by the advertisement, an identifier of the application in which the advertisement was presented, a time when the advertisement was presented, a time when the interaction was received, or other suitable information may also be stored.

To provide the third-party system 109 associated with the received client application 110 or the advertiser 135 with information describing installations of the client application 110 identified by the advertisement, the received data comprising the client application 110 includes one or more instructions from the social networking system 130 that, when executed, writes data to a shared memory location of the mobile device 105 indicating the client application 110 was installed. When the data comprising the client application 110 is received and the client application is installed 430 on the mobile device 105, an indication the client application 110 was installed is stored 435 to the shared memory location. The social networking application 120 accesses the shared memory location and retrieves 440 the data indicating the client application 110 was installed. In one embodiment, the social networking application 120 associates user ID information used by the social networking application 120 with the data indicating the client application 110 and communicates the user ID information and the data indicating the client application 110 was installed to the social networking system 130.

The indication the client application 110 was installed may be stored in a user profile associated with the user ID information by the social networking system 130. Hence, the user profile maintained by the social networking system 130 includes information describing client applications 110 installed on one or more mobile devices 105 by the user corresponding to the user profile. The indication the client application 110 was installed may include a client identifier associated with the client application 110, an identifier of the mobile device 105 on which the client application 110 was installed, a type of the mobile device 105, a date and time when the client application 110 was installed, or other information describing the client application 110 or installation of the client application 110.

Based on information in the user profile associated with the user ID information, the social networking system 130 may provide a third-party system 109 or an advertiser 135 associated with the client application 110 or with the presented advertisement. For example, the social networking system 130 may determine if the user profile indicates an interaction with an advertisement associated with the client application 110 was received 425 before the client application 110 was installed 430. For example, the social networking system 130 determines if the user profile includes an interaction with an advertisement associated with a client application has timing information within a threshold time of a time when the data indicating the client application 110 was installed is received. If the user profile indicates an interaction with an advertisement associated with the client application 110 occurred before receipt of the data indicating the client application 110 was installed, the social networking system 130 may infer that the advertisement associated with the client device 110 was converted. This inferred conversion may be communicated to a third-party system 109 or an advertiser 135 to determine the effectiveness of advertisements associated with the client application 110.

Tracking of Native Application Installations

A user of a mobile device 105 may retrieve and install native applications, such as the client application 110, which execute using an operating system embedded on the mobile device 105. As described above in conjunction with FIGS. 1A and 2, the client application 110 presents content to a user of the mobile device 105. The social networking application 120 may identify one or more client applications 110 for a mobile device user to install. For example, the social networking application 120 recommends one or more client applications 110 for the mobile device user to retrieve and install based on information associated with the user via the user profile store 305, the edge store 310, and/or the action log 335. In one embodiment, the social networking system 130 identifies objects associated with client applications 110 for which a user of the mobile device 105 has at least a threshold affinity and presents the objects to the user via the social networking application 120. The objects may include one or more links for retrieving a client application 110 associated with the object from a third-party system 109 or from the social networking system 130. Alternatively, an advertisement presented to the user includes a link for retrieving a client application 110.

By accessing a link for retrieving the client application 110, a user of the mobile device retrieves data comprising the client application 110 from a third-party system 109 or from the social networking system 130. In one embodiment, accessing the link communicates information to an application store executing on the mobile device 105, and the application store users the communicated information to retrieve data comprising the client application 110 associated with the link. When the mobile device 105 receives the data comprising the client application 110 from the third-party system 109, or from another source, the mobile device 105 executes the received data to install the client application 110 on the mobile device 105.

To provide the third-party system 109 with information describing the number of times the client device 110 is installed, the data comprising the client application 110 includes one or more instructions from the social networking system 130 that, when executed, writes data to a shared memory location of the mobile device 105 indicating the client application 110 was installed. The social networking application 120 accesses the shared memory location and retrieves the data indicating the client application 110 was installed. In one embodiment, the social networking application 120 sends the indication the client application 110 was installed and associates user ID information used by the social networking application 120 to the social networking system 130.

Based on the user ID information received from the social networking application 120, the social networking system 130 identifies a user profile associated with the user of the mobile device 105. The indication the client application 110 was installed is stored in the identified user profile. As described above in conjunction with FIG. 4, the social networking system 130 may analyze additional interactions with content stored in the user profile to determine if the installation of the client application 110 is a conversion of an advertisement associated with the client application 110 with which the user was previously presented or with which the user previously interacted.

The social networking system 130 may communicate the indication the client application 110 was installed on the mobile device 105 to a third-party system 109 associated with the client application 110. This allows the third-party application 110 to track installations of the client application 110. Similarly, the social networking system 130 may indicate to the third-party system 109 or to an advertiser 135 that the social networking system 130 infers the installation to be a conversion of a previously presented advertisement associated with the client device 110. Alternatively, the social networking system 130 may transmit the indication the client application was installed on the mobile device 105 to an advertiser 135 associated with the client application 110 or with the third-party system 109, allowing the advertiser 135 to track installations of client applications 110 promoted by advertisements from the advertiser 135.

In one embodiment, the social networking system 130 may communicate additional information associated with the indication the client application 110 was installed on the mobile device 105 to the third-party system 109. For example, the type of the mobile device 105 and/or an identifier of the mobile device 105 are included in the indication the client application 110. This allows the third-party system 109 to maintain analytics data describing characteristics of various mobile devices 105 on which the client application 110 was installed. The social networking system may also anonymize the user ID information and transmit the anonymized user ID information to the third-party system 109 for analytics. For example, the social networking system 130 hashes user ID information and transmits the hashed user ID information to the third-party system 109. Hashing of user ID information is further described in U.S. patent application Ser. No. 13/306,901, filed on Nov. 29, 2011, which is hereby incorporated by reference in its entirety. Further, subject to one or more privacy settings associated with the user profile, limited information from the user profile may be retrieved and communicated to the third-party system 109 along with the indication the client application 110 was installed on the mobile device 105.

Although described with reference to a social networking system 130 and a social networking system application 120 executing on a mobile device 105, the preceding description may be used with other online systems that serve advertisements. For example, an application associated with an online system and executing on a mobile device 105 may retrieve user ID information from a shared memory location of the mobile device and communicate the retrieved user ID information to the online system along with additional information as described above.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   receiving, from an online system, data comprising a client application for execution by an operating system of a mobile device and one or more instructions from the online system that, when executed, writes data to a shared memory location included in the mobile device indicating the client application was installed on the mobile device;
   executing the data comprising the client application to install the client application on the mobile device;
   responsive to installing the client application on the mobile device, executing the one or more instructions received from the online system;
   storing, in the shared memory location on the mobile device, an indication the client application was installed on the mobile device;
   retrieving from the shared memory location the stored indication that the client application was installed on the mobile device and a user identification associated with a user of the online system and used by the online system to maintain data associated with the user, the stored indication and the user identification retrieved by an online system application operating on the mobile device; and
   sending, from the online system application to the online system, the stored indication that the client application was installed on the mobile device and the user identification.

2. The method of claim 1, wherein the indication the client application was installed includes one or more of a group consisting of: a client identifier associated with the client application, an identifier of the mobile device, a type of the mobile device, a date and time when the client application was installed, and any combination thereof.

3. The method of claim 1, wherein the online system is a social networking system.

4. A method comprising:
   sending, from an online system to a mobile device, a client application and one or more instructions that, when executed, writes data to a shared memory location included in the mobile device indicating whether the client application was installed on the mobile device;
   an online system application operating on the mobile device retrieving, from the shared memory location on the mobile device, an indication of whether the client application was installed on the mobile device and user identification information associated with a user of the online system and used by the online system to maintain data associated with the user, the online system application associates the user identification used by the social networking system with the indication of whether the client application was installed on the mobile device;
   the online system receiving, from the online system application operating on the mobile device, the indication of whether the client application was installed on the mobile device and the user identification information associated with a user of an online system;
   identifying a user profile of a user associated with the user identification information, the user profile maintained by the online system; and
   storing the indication of whether the client application was installed on the mobile device in the user profile.

5. The method of claim 4, wherein the user identification information associated with the user of the online system is provided by the online system application operating on the mobile device.

6. The method of claim 4, further comprising:
   retrieving information describing user interactions with content from the user profile;
   determining whether the user interacted with an advertisement associated with the client application prior to receiving the indication the client application was installed on the mobile device;
   inferring an advertisement conversion responsive to determining the user interacted with an advertisement associated with the client application prior to receiving the indication the client application was installed on the mobile device; and
   providing a notification of the inferred advertisement conversion to a third-party system associated with the client application.

7. The method of claim 4, further comprising:
   retrieving information describing user interactions with content from the user profile;
   determining whether the user interacted with an advertisement associated with the client application prior to receiving the indication the client application was installed on the mobile device;
   inferring an advertisement conversion responsive to determining the user interacted with an advertisement associated with the client application prior to receiving the indication the client application was installed on the mobile device; and
   providing a notification of the inferred advertisement conversion to an advertiser associated with the advertisement with which the user interacted.

8. The method of claim 7, wherein the notification of the inferred advertisement conversion includes an identification of the user.

9. The method of claim 8, wherein the identification of the user comprises a hash value generated by applying a hash function to the user identification information.

10. The method of claim 8, further comprising:
    providing information retrieved from the user profile subject to one or more privacy settings to the advertiser associated with the advertisement.

11. The method of claim 4, further comprising:
    providing the indication of whether the client application was installed on the mobile device and an identification of the user to a third-party system associated with the client application.

12. The method of claim 11, wherein providing the indication of whether the client application was installed on the mobile device comprises:
providing the indication of whether the client application was installed on the mobile device and a type associated with the mobile device.

13. The method of claim 11, wherein providing the indication of whether the client application was installed on the mobile device comprises:
providing the indication of whether the client application was installed on the mobile device including a date and time when the client application was installed on the mobile device.

14. The method of claim 11, wherein the identification of the user comprises a hash value generated by applying a hash function to the user identification information.

15. The method of claim 4, wherein the indication of whether the client application was installed on the mobile device includes one or more of a group consisting of: a client identifier associated with the client application: an identifier of the mobile device, a type of the mobile device, a date and time when the client application was installed, and any combination thereof.

16. The method of claim 4, wherein the online system is a social networking system.

17. A non-transitory computer-readable storage medium having executable computer program instructions embodied thereon, the instructions, when executed by a processor, cause the processor to:
receive, from and online system, data comprising a client application for execution by an operating system of a mobile device and one or more instructions form the online system that, when executed the processor, writes data to a shared memory location included in the mobile device indicating the client application was installed on the mobile device;
execute the data comprising the client application to install the client application on the mobile device;
responsive to installing the client application on the mobile device, execute the one or more instructions received from the online system;
store, in the shared memory location on the mobile device, an indication the client application was installed on the mobile device;
retrieve from the shared memory location the stored indication that the client application was installed on the mobile device and a user identification associated with a user of the online system and used by the online system to maintain data associated with the user, the stored indication and the user identification retrieved by an online system application operating on the mobile device; and
send, from the online system application to the online system, the stored indication that the client application was installed on the mobile device and the user identification.

18. The non-transitory computer-readable storage medium of claim 17, wherein the indication the client application was installed includes one or more of a group consisting of: a client identifier associated with the client application: an identifier of the mobile device, a type of the mobile device, a date and time when the client application was installed, and any combination thereof.

* * * * *